(12) United States Patent
Fildes et al.

(10) Patent No.: US 9,442,499 B2
(45) Date of Patent: Sep. 13, 2016

(54) CONTROLLER FOR TEMPERATURE REGULATION SYSTEM

(75) Inventors: Christopher Fildes, Elyria, OH (US); John Bohan, Avon Lake, OH (US)

(73) Assignee: R. W. Beckett Corporation, North Ridgeville, OH (US)

( * ) Notice: Subject to any disclaimer, the term of this patent is extended or adjusted under 35 U.S.C. 154(b) by 1207 days.

(21) Appl. No.: 12/435,264

(22) Filed: May 4, 2009

(65) Prior Publication Data

US 2010/0280679 A1   Nov. 4, 2010

(51) Int. Cl.
 G05D 23/19 (2006.01)
 F24D 19/10 (2006.01)

(52) U.S. Cl.
 CPC ....... G05D 23/1905 (2013.01); F24D 19/1066 (2013.01)

(58) Field of Classification Search
 CPC .............. G06F 1/206; G05D 23/1917; G05D 23/1905; F24D 3/02; F24D 3/08; F24D 19/1066; F24H 3/006
 USPC ...................... 700/299, 300; 237/8 R, 19, 16
 See application file for complete search history.

(56) References Cited

U.S. PATENT DOCUMENTS

| | | | |
|---|---|---|---|
| 3,590,910 A * | 7/1971 | Lorenz | 165/221 |
| 5,042,431 A | 8/1991 | Shprecher et al. | |
| 5,190,215 A | 3/1993 | Habermehl, Jr. et al. | |
| 5,216,623 A | 6/1993 | Barrett et al. | |
| 5,775,582 A | 7/1998 | Hammer | |
| 5,779,143 A * | 7/1998 | Michaud et al. | 237/8 R |
| 5,829,475 A * | 11/1998 | Acker | 137/337 |
| 5,855,320 A * | 1/1999 | Grinbergs | 237/46 |
| 5,984,198 A | 11/1999 | Bennett et al. | |
| 6,032,868 A * | 3/2000 | DiMarco | 237/8 R |
| 6,109,339 A * | 8/2000 | Talbert et al. | 165/48.1 |
| 6,216,685 B1 * | 4/2001 | Payne | 126/80 |
| 6,402,043 B1 | 6/2002 | Cockerill | |
| 6,536,678 B2 | 3/2003 | Pouchak | |
| 7,015,432 B2 * | 3/2006 | Valbh et al. | 219/486 |
| 7,240,851 B2 | 7/2007 | Walsh, Jr. | |
| 7,356,548 B1 | 4/2008 | Culp et al. | |
| 7,455,237 B2 * | 11/2008 | Kates | 236/1 B |
| 7,460,933 B2 * | 12/2008 | Chapman et al. | 700/300 |
| 7,831,340 B2 | 11/2010 | Fusi | |
| 7,962,536 B2 | 6/2011 | Culp et al. | |
| 7,966,099 B2 | 6/2011 | Fima | |
| 7,970,494 B2 | 6/2011 | Fima | |
| 8,204,633 B2 * | 6/2012 | Harbin et al. | 700/295 |

(Continued)

OTHER PUBLICATIONS

U.S. Appl. No. 12/435,008, filed May 4, 2009, Bohan et al.

(Continued)

*Primary Examiner* — Kenneth M Lo
*Assistant Examiner* — Jason Lin
(74) *Attorney, Agent, or Firm* — Eschweiler & Associates, LLC (57) ABSTRACT

One embodiment relates to a method for temperature regulation of a medium to be circulated through a plurality of zones of a facility. In this method, a call for heat is received. The method identifies a zone within the plurality of zones from which the call for heat originated. The medium is then heated to a first temperature range if the identified zone is a first zone within the facility and is heated to a second temperature range if the identified zone is a second zone within the facility. The first and second temperature ranges differ from one another. Other methods and systems are also disclosed.

20 Claims, 6 Drawing Sheets

(56) References Cited

U.S. PATENT DOCUMENTS

| | | | |
|---|---|---|---|
| 2003/0200011 A1* | 10/2003 | Grauer | 700/300 |
| 2004/0065095 A1* | 4/2004 | Osborne et al. | 62/160 |
| 2005/0156051 A1* | 7/2005 | Sanchez | 236/11 |
| 2005/0258260 A1 | 11/2005 | Ahmed | |
| 2005/0268628 A1* | 12/2005 | Thompson | 62/176.5 |
| 2006/0069453 A1* | 3/2006 | DeBourke | E03C 1/041 700/19 |
| 2006/0272830 A1 | 12/2006 | Fima | |
| 2007/0000908 A1 | 1/2007 | Bohan, Jr. et al. | |
| 2007/0051819 A1* | 3/2007 | Isaacson | 236/20 R |
| 2007/0085678 A1 | 4/2007 | Joy et al. | |
| 2007/0179678 A1* | 8/2007 | Nordberg et al. | 700/300 |
| 2007/0191994 A1* | 8/2007 | Patterson et al. | 700/299 |
| 2007/0205292 A1* | 9/2007 | Kwak | 236/21 B |
| 2007/0246550 A1* | 10/2007 | Rodenbeck et al. | 236/12.11 |
| 2009/0030555 A1* | 1/2009 | Gray | 700/277 |
| 2009/0057425 A1* | 3/2009 | Sullivan et al. | 236/51 |
| 2009/0090789 A1* | 4/2009 | Zirkiyev et al. | 237/8 A |
| 2009/0204263 A1* | 8/2009 | Love | 700/282 |
| 2010/0012291 A1* | 1/2010 | Sporie | 165/61 |

OTHER PUBLICATIONS

U.S. Appl. No. 12/435,149, filed May 4, 2009, Bohan et al.
U.S. Appl. No. 12/435,238, filed May 4, 2009, Fildes et al.
Non-Final Office Action from U.S. Appl. No. 12/435,008. 29 Pages.
U.S. Appl. No. 12/834,451, filed Jul. 12, 2010.
Non-Final Office Action Dated Aug. 25, 2011 for U.S. Appl. No. 12/435,149. 30 Pages.
Non-Final Office Action Dated Oct. 11, 2011 for U.S. Appl. No. 12/435,238.

\* cited by examiner

CONTROLLER FOR TEMPERATURE REGULATION SYSTEM

FIELD OF DISCLOSURE

The present disclosure relates generally to controllers for temperature regulation systems, such as boiler systems, for example.

BACKGROUND

Boiler systems have been used to regulate the temperature of commercial and residential facilities for a number of years. However, despite the fact that boiler systems have been around for many years, innovations continue to change the manner in which these systems operate.

Figure 1:
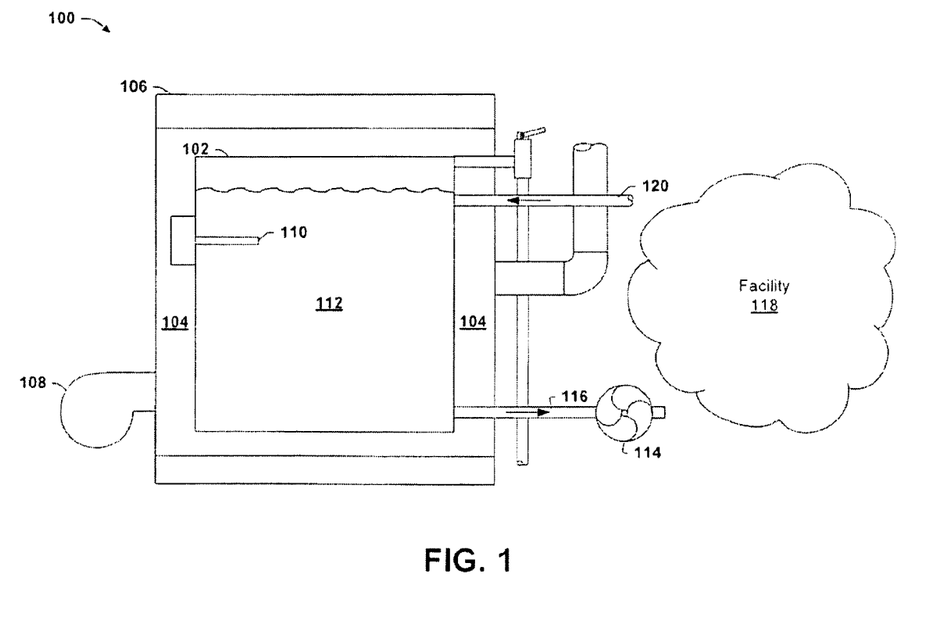
FIG. 1 is a diagram of conventional boiler system that heats a medium to single temperature and circulates the heated medium through a facility.

FIG. 1 illustrates a conventional boiler 100. The boiler 100 includes a boiler tank 102 surrounded by an insulating material layer 104, which is encased within a boiler enclosure 106. A burner 108 works in conjunction with a temperature sensor 110 to heat water 112 within the tank 102 to a desired temperature. After the water 112 is heated to the desired temperature, a circulation pump 114 pumps the heated water out an outbound line 116 to a residential or commercial facility 118, for example. After the heated water takes whatever path is desired in the facility 118, the water (now cooled) returns through a supply/return line 120 to the tank 102. In this manner, the water can provide various heating functions to the facility 118.

Notably, in this conventional boiler 100 the water 112 is always heated between fixed high and low temperature setpoints for circulation to the facility 118. While this streamlined manner of control is efficient in many respects, the inventors have appreciated that such a system is less than ideal for several reasons. Therefore, the inventors have devised improved boiler systems.

SUMMARY

The following presents a simplified summary of the disclosure in order to provide a basic understanding of some aspects of the disclosure. This summary is not an extensive overview of the disclosure, and is neither intended to identify key or critical elements of the disclosure nor to delineate the scope of the disclosure. Rather, the purpose of the summary is to present some concepts of the disclosure in a simplified form as a prelude to the more detailed description that is presented later.

One embodiment relates to a method for temperature regulation of a medium to be circulated through a plurality of zones of a facility. In this method, a call for heat is received. The method identifies a zone within the plurality of zones from which the call for heat originated. The medium is then heated to a first temperature range if the identified zone is a first zone within the facility and is heated to a second temperature range if the identified zone is a second zone within the facility. The first and second temperature ranges differ from one another. Other methods and systems are also disclosed.

The following description and annexed drawings set forth in detail certain illustrative aspects and implementations of the disclosure. These are indicative of but a few of the various ways in which the principles of the disclosure may be employed.

DETAILED DESCRIPTION

The present disclosure will now be described with reference to the drawings where like reference numerals are used to refer to like elements throughout, and where the illustrated structures are not necessarily drawn to scale. Nothing in this detailed description is admitted as prior art.

In some embodiments described herein, a temperature regulation system, such as a boiler system, is adapted to receive at least two calls for heat from at least two respective zones of a facility. When a call for heat is received, the temperature regulation system actively heats a medium within a temperature range associated with the zone from which the call for heat originated. For example, if the call for heat originated from a room that is presently below a desired room temperature, the medium could be actively heated to a first temperature that is sufficient for radiative heating of the room. In contrast, if the call for heat originated from a fixture or appliance using potable water, such as a shower or bath, the medium could be actively heated to a second temperature that differs from the first temperature and which is suitable for bathing or showering. By selectively heating the medium to at least two different temperature ranges, the system can provide a good balance between fuel efficiency and user comfort and/or convenience over a wide variety of applications.

Figure 2:
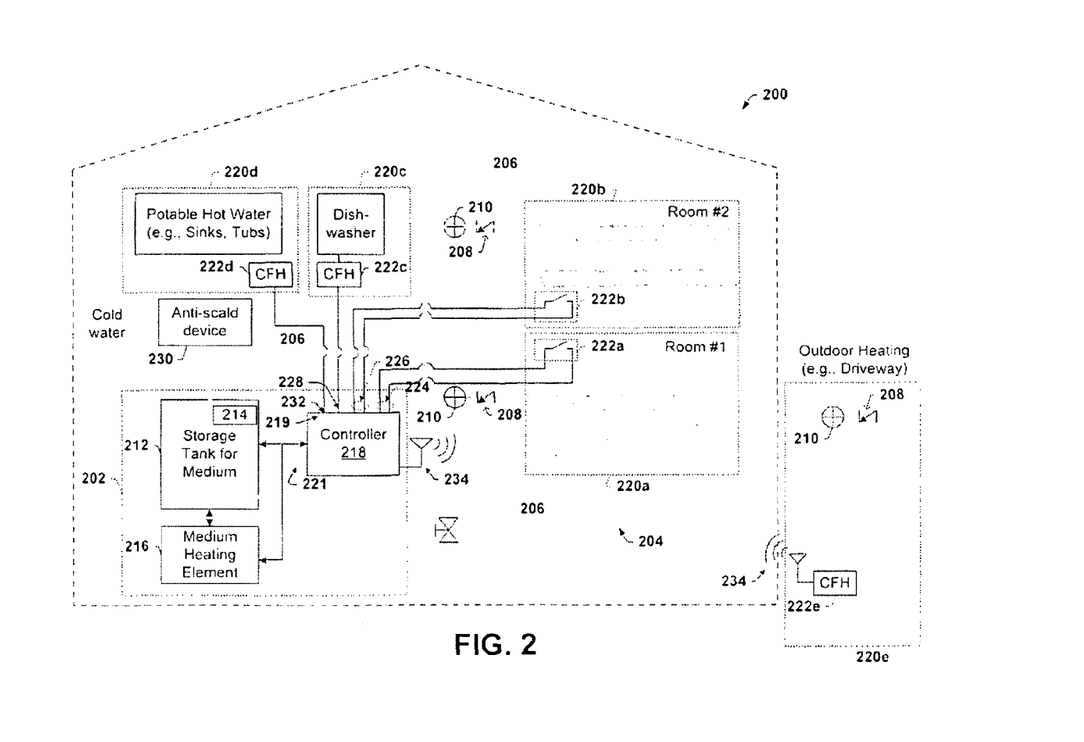
FIG. 2 is a diagram of a facility having a temperature regulation system that heats a medium to different temperature ranges depending on where a call for heat originates.

FIG. 2 shows an example of a residential or commercial facility having a temperature regulation system 200 that actively heats a medium to at least two different temperature ranges. As mentioned, for the comfort and/or convenience of people at the facility, it may be desirable to deliver the medium, such as water or a water glycol mix, to different zones of the facility at different temperatures. To facilitate this functionality, the facility includes a temperature regulation unit 202 and a medium delivery system 204. In short, the temperature regulation unit 202 regulates the temperature of some quantity of the medium, after which the medium delivery system 204 circulates the heated medium through at least some portion of the facility.

The temperature regulation unit 202 typically includes a storage tank 212 in which the medium is stored, a temperature sensor 214 for detecting the temperature of the medium in the storage tank 212, and a medium heating element 216 (e.g., gas burner, oil burner, or electric heater). In addition, the temperature regulation unit 202 includes a controller 218. The controller 218 includes an input interface 219 that is operable to receive calls for heat from multiple zones 220 (e.g., zones 220a-220e), as well as an output interface 221 for delivering one or more control signals.

The medium delivery system 204 typically includes a series of pipes 206, valves 208, and circulators 210 positioned throughout the facility. These components respond to various control signals to circulate the heated medium through multiple zones 220 (e.g., zones 220a-220e). The control signals for the medium delivery system 204 can stem from a controller 218 in the temperature regulation unit 202 (e.g., controller 218), or can stem from other controllers elsewhere in the system.

The zones 220 can include respective call for heat generators 222, through which each zone 220 can, in general, receive the heated medium at a different temperature. The first and second zones 220a, 220b are illustrated as first and second rooms having first and second call for heat generators 222a, 222b, respectively. The first and second call for heat generators 222a, 222b are shown as thermostats that each have a 2-wire connection coupled to first and second terminals 224, 226 on the input interface 219 of the controller 218.

A third zone 220c is shown as a commercial dishwasher having a call for heat generator 222c, which is shown as having a single line connection coupled to a third terminal 228 on the input interface 219 of the controller 218.

A fourth zone 220d is illustrated as a fixture or appliance that delivers potable water, such as a sink or tub, and which may take advantage of an antiscald device 230. The fourth zone 220d includes call for heat generator 222d having a single line connection, which is coupled to a fourth terminal 232 on the input interface 219 of the controller 218.

A fifth zone 220e is illustrated as an outdoor area (e.g., a driveway or patio) that communicates with the controller 218 via a wireless connection 234. Note that although specific interfaces are shown for various zones (e.g., first zone has a thermostat with a 2-wire connection), the interfaces could be permuted relative to the zones (e.g., first zone could have thermostat with a wireless connection) and other interfaces could also be used.

During operation, the controller 218 can communicate with the temperature sensor 214 to monitor the temperature of the medium in the storage tank 212. If no calls for heat are currently pending, the controller 218 can continuously or intermittently monitor the temperature and instruct the medium heating element 216 to heat at various times, thereby keeping the medium in the storage tank 212 within some minimum temperature range. In some embodiments this minimum temperature range corresponds to an acceptable temperature range at which potable hot water is to be delivered, but it could also be another temperature range as well.

If a zone sends a call for heat (e.g., the dishwasher is in use or radiative heat is needed), the controller 218 identifies the zone or zones from which the call for heat originates and determines what temperature is associated with the zone(s). Then, based on where the call for heat originates, the controller 218 can instruct the medium heating element 216 to heat the medium in the storage tank 212 to the temperature associated with the zone from which the call for heat originated. After (or during or before) heating, the circulators 210 and valves 208 are configured to circulate the heated medium to the zone(s) from which the call for heat originated. The heated medium is then delivered to the zone(s).

For purposes of illustration, this disclosure now discusses a more specific scenario where the zones 220a-220e are associated with the following medium temperatures:

| Application (Zone) | Temperature Range of Medium |
|---|---|
| Potable Water (220d) | 120-140° F. |
| Radiative heat (220a, 220b) | 160-180° F. |
| Commercial Dishwasher (220c) | 190° F. max |
| Driveway (220e) | 60° F. max |
| Storage Tank (212) | 120-140° F. |

For example, if the thermostat 222a in the first room detects the room's air temperature is below the temperature point set for the first room, the thermostat 222a can send a call for heat to the controller 218. Upon discerning the call for heat is from the first zone 220a, the controller 218 can instruct the medium heating element 216 to heat the medium within the temperature range of 160° F.-180° F., which is sufficiently hot to heat the room.

By contrast, if the dishwasher in third zone 220c is activated, its call for heat generator 222c can send a call for heat to the controller 218. Upon discerning the call for heat is from the dishwasher, the controller 218 can instruct the medium heating element 216 to heat the medium in the storage tank 212 to about 190° F., which is sufficient for commercial dishwashing.

If potable water is desired (e.g., hot water is needed for a shower), the controller 218 can measure the temperature of the medium in response to a call for heat from the fourth zone 220d. If the temperature indicates that potable water to be delivered to the fixture is below 120° F., the controller 218 can instruct the medium heating element 216 to heat the medium in the storage tank 212 to 120° F.-140° F. On the other hand, if the sensed temperature indicates that potable water to be delivered to the fixture has a temperature greater than 140° F., the controller 218 would circulate but not heat the medium. In embodiments where the medium is water, the anti-scald device 230 mixes cold water with the heated medium (water) until the potable hot water delivered to the fixture is within the desired temperature range of 120° F.-140° F. Alternatively, the temperature regulation unit 202 could use a preheating or indirect heating loop positioned within the storage tank 212. Because the water within this indirect heating loop can be cooler than the other medium in the storage tank 212, water from the indirect heating loop could be delivered at the temperature desired for potable water.

If call for heat generator 222e signals that driveway heating is desired in fifth zone 220e, in some embodiments the controller 218 can temporarily suspend the minimum temperate range for the medium in the storage tank 212. For example, if the minimum temperature range in the storage tank is 120-140° F. and the driveway requires the medium be heated to only 60° F., the minimum temperature range can be temporality reduced. Even if the medium initially stored in the storage tank 212 has a temperature greater than 60° F., as the cooled medium returns to the storage tank from the driveway zone, the temperature of the medium in the storage tank 212 will quickly drop to the 60° F. range. In other embodiments, other devices (e.g., an anti-scald device) can be used to prevent the medium from being delivered at more than 60° F. This is because if the medium is delivered at too high of a temperature, the overheated medium can heat the driveway too quickly, which may cause driveway cracking.

Figure 3:
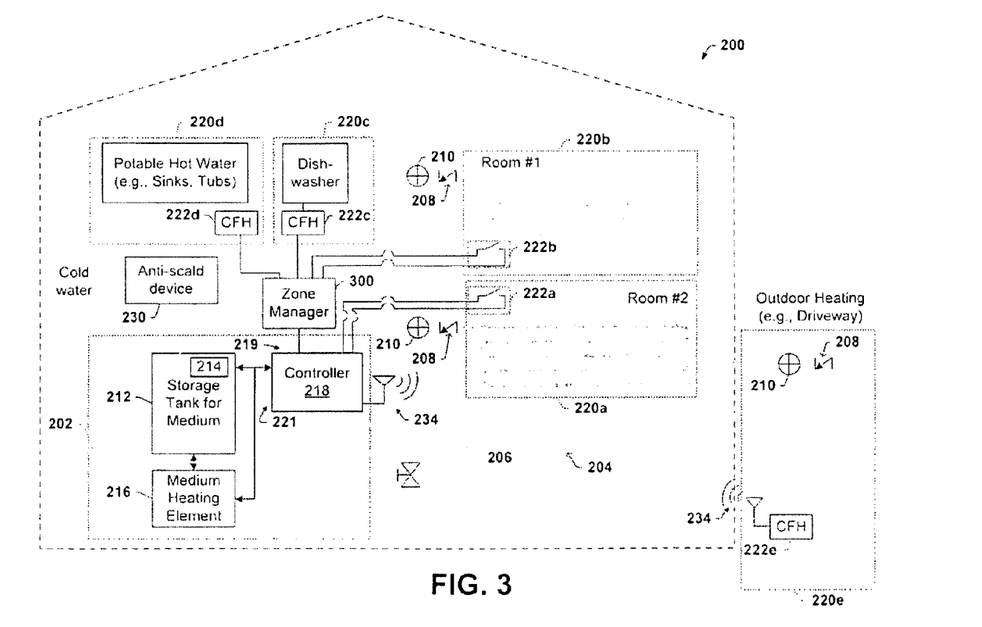
FIG. 3 is a diagram of a facility having a temperature regulation system that includes a zone controller.

In contrast to FIG. 2, which showed a controller 218 having a separate terminal for each call for heat generator 222, other input and output interfaces 219, 221 are also possible. FIG. 3 shows another embodiment that includes a zone manager 300 that interfaces with the controller 218 via a single terminal. The zone manager 300 is operable to monitor the calls for heat from the various zones, and can include a single terminal that interfaces to the controller 218, thereby simplifying the interface for the controller. The input and output interfaces 219, 221 may also include other numbers of terminals.

Figure 4:
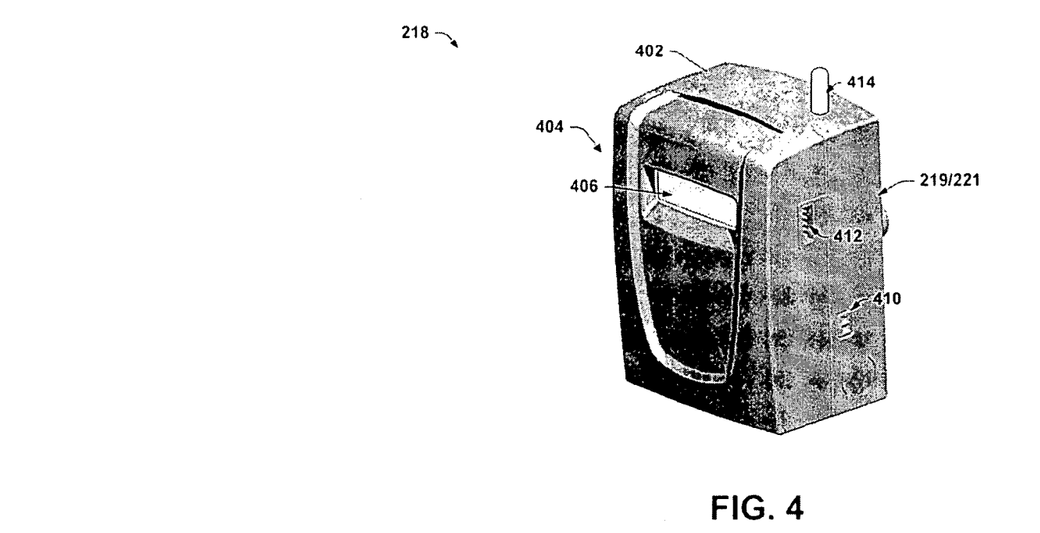
FIG. 4 illustrates a diagram of a controller in accordance with one embodiment.
Figure 5:
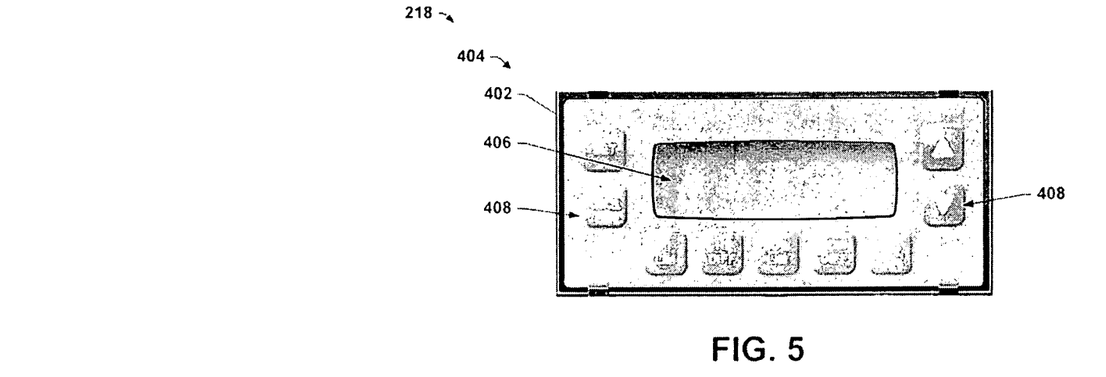
FIG. 5 illustrates a diagram of a controller interface in accordance with one embodiment.

Turning now to FIGS. 4-5, one can see a more detailed depiction of one real world implementation for the controller 218. As shown, the controller 218 can include a controller housing or case 402 and a user interface 404. The user interface 404 includes a display 406 configured, for example, to display alphanumeric characters, and pushbuttons 408 or some other user input mechanism. Often, the alphanumeric characters represent one or more temperature conditions, pressure conditions, or set points associated with the temperature regulation system.

To receive call for heat from various zones and provide control signals, the controller 218 includes an input interface 219 and an output interface 221. The input and output interfaces 219, 221 generally include various terminals for receiving digital or analog signals. The illustrated input and output interfaces 219, 221 include a thermostat input terminal 410 for connection to a thermostat, a bidirectional communications or bus port terminal 412 (e.g., as a 4-wire serial bus port), and an RF antenna 414. In some embodiments, the input and output interfaces 219, 221 are the same physical terminals (e.g., bidirectional terminals), while in other embodiments the terminals for the input and output interfaces 219, 221 may be separate physical terminals. The input and output interfaces may also include other terminals, such as a power input terminal (e.g., a 120VAC or 24VDC power input).

Now that several examples of systems and devices have been discussed, methods in accordance with some embodiments are now described with reference to FIG. 6-7. The previously described systems and devices include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

Figure 6:
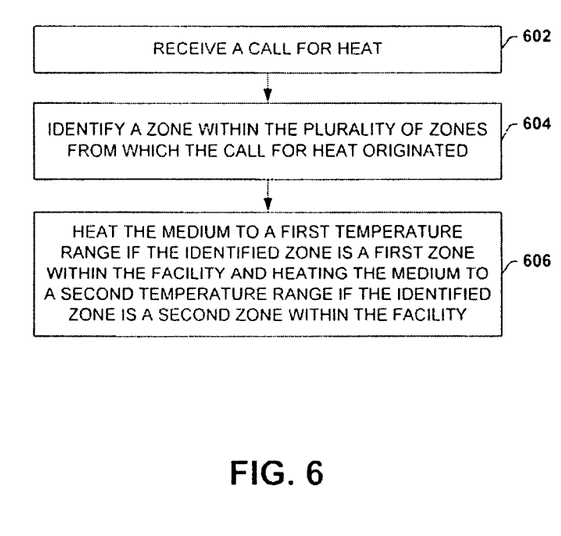
FIG. 6 is a flow diagram illustrating a method for temperature regulation of a medium to be circulated through a plurality of zones of a facility.

FIG. 6 shows a somewhat generalized method for temperature regulation of a medium to be circulated through a plurality of zones of a facility. In the method, a call for heat is received at 602. At 604, the method identifies a zone within the plurality of zones from which the call for heat originated. At 606, the method heats the medium to a first temperature range if the identified zone is a first zone, but heats the medium to a second temperature range if the identified zone is a second zone.

It will be appreciated that although some embodiments described herein refer to heating a medium to different "temperature ranges" based on where a call for heat originated, the term "temperature ranges" is to be construed broadly. For example, heating to a temperature range could include heating to a single temperature setpoint (e.g., in the case of a modulating burner), heating to a fixed temperature range (e.g., in the case of an on/off burner and a hot water heat call), or heating to a variable temperature range that is automatically adjusted based on one or more separate algorithms.

In one embodiment where the medium is heated to a variable temperature range, the temperature to which the medium is heated can be based on an economizing algorithm that adjusts a maximum temperature of the temperature range based on either a duty cycle of a call for heat or the outdoor temperature. For example, a temperature regulation system could monitor the outdoor temperature and alter the temperature of the medium to be delivered for radiative heating based on the outdoor temperature. If it is particularly cold outside, the medium may be heated to a higher temperature to provide faster heating, thereby offsetting the faster cooling of the room due to the low temperature. On the other hand, if it is relatively warm outside, the medium can be heated to a lower temperature to provide slower heating, which is still sufficient to heat the room but saves fuel compared to the higher temperature used in cold weather. Similar algorithms can be based on duty cycle, which in some respects are indicative of the cooling rate of the room, for example, due to the external temperature.

Figure 7:
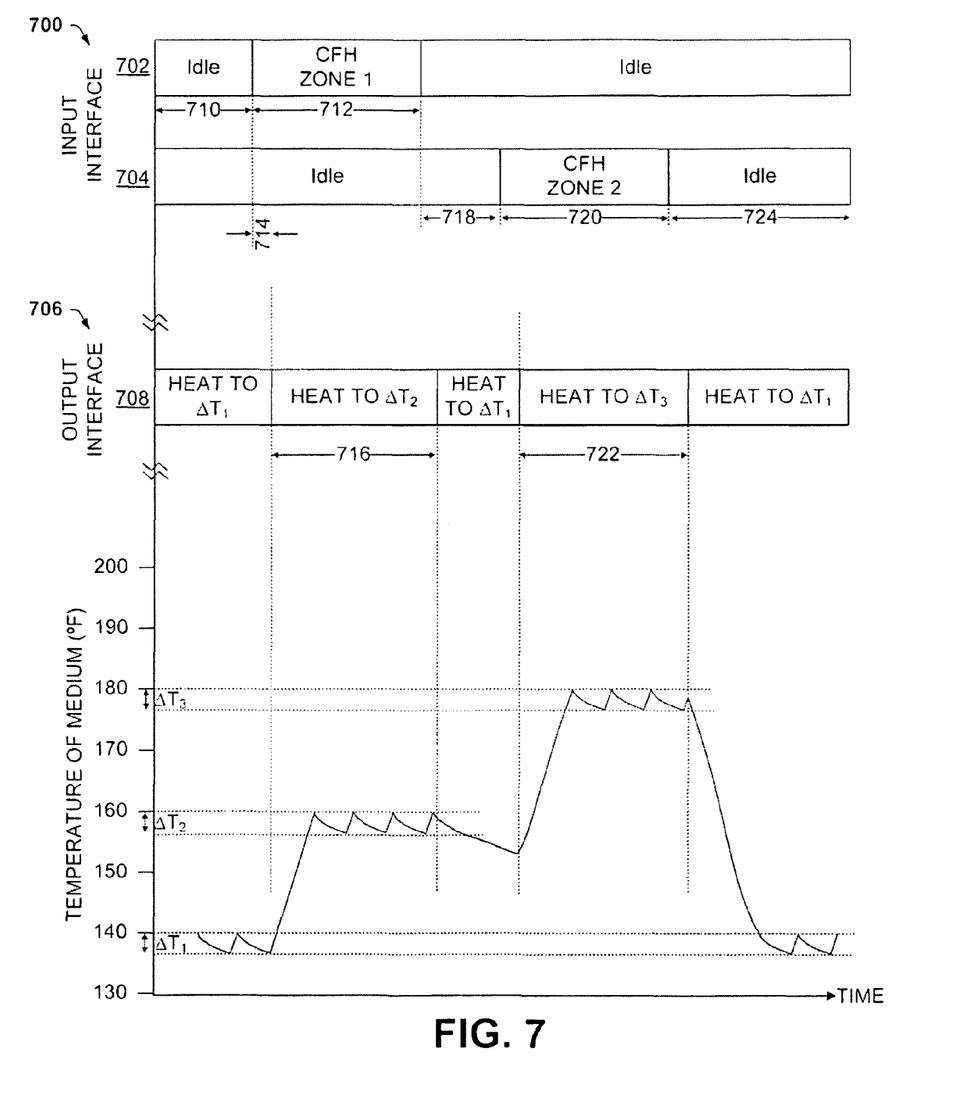
FIG. 7 is a timing diagram illustrating an example of a input interface and an output interface and the associated temperature of the medium during various conditions.

Turning now to FIG. 7, one can see a more detailed depiction of a method for selectively heating the medium to two different temperatures based on where a call for heat originated. While this method is shown with regards to waveforms, these waveforms are only illustrative and do not limit the scope of this disclosure in any way, as other waveforms could also enable similar functionality. For purposes of illustration, FIG. 7 shows an input interface 700 that comprises a first signal 702 and a second signal 704. An output interface 706 shows a control signal 708 that facilitates the heating of the medium as shown by the waveforms at the bottom of FIG. 7.

At a first time interval 710, the first and second signals 702, 704 are idle. Thus, no calls for heat are pending. Accordingly, at this first time interval 710, the control signal 708 is structured to keep the temperature of the medium within a minimum temperature range $\Delta T1$. Typically, the system exhibits some hysteresis during this first time interval 710 as a practical matter.

During second time interval 712, the first signal 702 is asserted (CFH ZONE 1), which indicates a call for heat is requested for a first zone in the facility. After some brief time delay 714, the output interface 706 reflects this change and changes the control signal 708 to enable heating of the medium to a second temperature range $\Delta T2$ during third time interval 716.

During fourth time interval 718, the first and second signals 702, 704 are again de-asserted, and the medium beings to cool. However, before the medium cools back to the minimum temperature range $\Delta T1$, during fifth time interval 720 the second signal 704 is asserted (CFH zone 2), which indicates a call for heat is requested from a second zone in the facility. The output interface subsequently reflects this change at sixth time interval 722 and changes the control signal to enable heating of the medium to a third temperature range $\Delta T3$.

During seventh time interval 724, the first and second signals 702, 704 are again de-asserted and the medium gradually cools back to the minimum temperature range $\Delta T1$. Although FIG. 7's embodiment has been shown with respect to two input signals and a single control signal, other embodiments could have other numbers of input signals and control signals. Also, the change in state of these input signals and control signals could be achieved in various ways. For example, these changes could be implemented as a change in voltage amplitude, change in phase, pre-defined digital values provided on a bus, or in other manners.

In addition to each zone being assigned its own temperature, each zone can also be assigned its own priority. Priority is useful, for example, if two or more zones concurrently send calls for heat. Thus, for example, if separate calls for heat are received for potable hot water and commercial dishwashing, the medium will be heated to a temperature for potable hot water because it has a higher priority. In this manner, respective priorities can be assigned to the respective zones. Controller 218 (and/or zone manager 300), can be programmed with a suitable priority scheme to enable desired system functionality.

While examples of the disclosure have been illustrated and described with respect to one or more implementations, alterations and/or modifications may be made to the these examples without departing from the spirit and scope of the appended claims. For example, although the terms "first", "second", "third", and so on, are used with respect to various features (e.g., in FIG. 2), it will be appreciated that these terms can be permuted and are not be limited to any particular embodiment. Some embodiments may include additional zones apart from those shown (e.g., a sixth zone), while other embodiments need not include all of the illustrated zones (e.g., another embodiment can include only a first zone and second zone)—where all such embodiments fall within the scope of the present disclosure. In addition, although examples have been described above in the context of a temperature regulation system having a storage tank that stores a medium (e.g., a hot water tank), it will be appreciated the concepts described herein are also applicable to "tankless" water heaters. In tankless water heaters, water or some other medium is quickly heated at a manifold as the water is flowing to a zone. Other variations are also possible.

In addition, although in some embodiments features can be implemented as hardware modules, in other embodiments the features can be performed by appropriate software routines or a combination of hardware and software. In regards to software implementations, the software may be read from a "computer readable medium", which includes any medium that participates in providing instructions to a node or to digital circuitry associated with the node. Such a medium may take numerous forms, including but not limited to, non-volatile media, volatile media, and transmission media. Non-volatile media includes, but is not limited to: magnetic disks, flash disks, EEPROM, and optical disks such as CDs or DVDS. Volatile media includes dynamic memory, including but not limited to: SRAM or DRAM. Transmission media includes, but is not limited to: coaxial cables, copper wire, fiber optics, etc. Transmission media can also include electromagnetic waves, such as a voltage wave, light wave, or radio wave.

In regard to the various functions performed by the above described components or structures (units, nodes, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A controller for temperature regulation the controller comprising:
an input interface configured to receive a first call for heat from a first thermostat arranged to measure ambient temperature in a first zone of a facility, receive a second call for heat from a second thermostat arranged to measure ambient temperature in a second zone of the facility, and receive a third call from a third zone, wherein the first and second thermostats are different and the first and second zones of the facility are different; and
an output interface, coupled to a medium heating element, configured to provide control signals that instruct the medium heating element to heat a liquid medium residing within a heating chamber to different temperatures based on a medium application, a medium delivery destination, a zone priority, and at least one of a duty cycle of a cooling rate associated with the zone destination or an outdoor temperature of a zone comprising an outdoor area, and enable delivery of the liquid medium to the first zone, the second zone, and the third zone at the different temperatures within the heating chamber.

2. The controller of claim 1, where the input interface is configured to receive at least one additional call for heat from at least one additional zone of the facility;
wherein the one or more control signals vary among a first state, a second state, and at least one additional state, the at least one additional state indicating the liquid medium is to be heated to the third temperature range.

3. The controller of claim 1, where the first zone, the second zone or the third zone comprises an outdoor area of the facility, and the medium heating element is configured to selectively heat the liquid medium in the heating chamber based on the medium application, the medium delivery destination, the zone priority, the duty cycle of the cooling rate associated with the zone destination and the outdoor temperature of the outdoor area.

4. The controller of claim 3, where the medium heating element is configured to selectively heat the medium in the heating chamber to different temperature ranges as a function of different states of the one or more control signals.

5. The controller of claim 1, where the output interface is further configured to provide another control signal to a circulator, the another control signal facilitating the circulator to circulate the medium through at least a portion of the facility.

6. The controller of claim 1, where the medium heating element, in response to the one or more controls signals, is configured to heat the liquid medium in the heating chamber to two different temperatures corresponding to two different rooms of the first zone and the second zone, a third different temperature corresponding to an outdoor area, and a fourth different temperature corresponding to an appliance.

7. The controller of claim 1, wherein the input interface comprises a first terminal coupled to a zone manager, the zone manager coupled to a multiple wired or wireless call for heat generators located at multiple respective zones in the facility and to assign different priorities to the first zone, the second zone and the third zone to facilitate delivery of the medium to the first zone, the second zone and the third zone based on the different priorities.

8. The controller of claim 1, wherein the heating element is a natural gas burner or an oil burner that provides a flame to heat the medium in the heating chamber.

9. The controller of claim 1, wherein the zone manager is further configured to assign the different priorities to the first zone and the second zone based on the medium application of the liquid medium that is delivered to the first zone or the second zone.

10. A temperature regulation system for a facility, comprising:
   a controller configured to receive calls for heat from thermostats within zones of the facility, and provide a control signal that selectively varies between states depending upon a medium application, a medium delivery destination, a zone priority, and at least one of a duty cycle of a cooling rate associated with the zone destination or an outdoor temperature of an outdoor area as one of the zones; and
   a medium heating element configured to heat a liquid medium residing within a storage tank, before being delivered and in response to the states of the control signal, to different temperatures based on a zone application, a zone delivery destination, a zone priority, and at least one of a duty cycle of a cooling rate associated with the zone destination or an outdoor temperature at an outdoor area, and enable delivery of the liquid medium to the zones at the different temperatures within the heating chamber.

11. The temperature regulation system of claim 10, further comprising:
   a circulator coupled to the controller and configured to selectively circulate the liquid medium through at least a portion of the facility.

12. The temperature regulation system of claim 10, where a first temperature range of the different temperatures is suitable for direct contact with human skin and where a second temperature range of the different temperatures is suitable for facilitating radiative heating of a zone of the facility.

13. A method for temperature regulation of a medium initially residing within a storage tank and to be circulated through a plurality of zones of a facility, comprising:
   receiving, via a controller, calls from the plurality of zones;
   generating, via the controller in response to the calls, control signals that instruct a medium heating element to heat a liquid medium within a heating chamber to different temperatures based on a medium application, a medium delivery destination, a zone priority, and at least one of a duty cycle of a cooling rate associated with the zone destination or an outdoor temperature of a zone comprising an outdoor area;
   heating the medium residing within the storage tank to a first temperature range, and a third temperature range in response to the control signals; and
   delivering the medium to the plurality of zones comprising a first zone, a second zone and a third zone with different temperature ranges based on a first priority, a second priority, and a third priority.

14. The method of claim 13, where the medium is heated by the medium heating element shared by the first and second zones.

15. The method of claim 14, further comprising:
   monitoring a temperature of the medium while the medium is heated by the medium heating element to determine whether the temperature of the medium is at the first temperature range or the second temperature range.

16. The method of claim 13, where the second temperature range is suitable for direct contact with human skin and where the first temperature range is suitable for facilitating radiative heating of the first zone of the facility.

17. The method of claim 13, further comprising:
   temporarily suspending a minimum temperature associated with the medium in response to a call for heat.

18. The method of claim 13, where heating the medium to the first and second temperature ranges is carried out using hysteresis.

19. The method of claim 13, where at least one of the first and second temperature ranges is a variable temperature range.

20. The method of claim 13, where at least one of the first and second temperature ranges is a single temperature setpoint.

* * * * *